(12) United States Patent
Fenick

(10) Patent No.: US 11,040,411 B1
(45) Date of Patent: Jun. 22, 2021

(54) DEPTH GAUGE

(71) Applicant: Joshua D. Fenick, Niantic, CT (US)

(72) Inventor: Joshua D. Fenick, Niantic, CT (US)

( * ) Notice: Subject to any disclaimer, the term of this patent is extended or adjusted under 35 U.S.C. 154(b) by 0 days.

(21) Appl. No.: 17/111,660

(22) Filed: Dec. 4, 2020

(51) Int. Cl.
| | |
|---|---|
| *G01B 3/28* | (2006.01) |
| *B23K 9/12* | (2006.01) |
| *B23K 26/70* | (2014.01) |
| *B23K 26/348* | (2014.01) |
| *G01B 7/26* | (2006.01) |

(52) U.S. Cl.
CPC ............ *B23K 9/122* (2013.01); *B23K 26/348* (2015.10); *B23K 26/702* (2015.10); *G01B 7/26* (2013.01)

(58) Field of Classification Search
CPC ... G01B 7/26; G01B 5/18; G01B 3/34; G01B 3/42; B23K 26/702
USPC .......................................................... 33/563
See application file for complete search history.

(56) References Cited

U.S. PATENT DOCUMENTS

| | | | | | |
|---|---|---|---|---|---|
| 2,389,842 | A | * | 11/1945 | Cummins | G01B 3/00 33/833 |
| 4,924,580 | A | * | 5/1990 | Garofalo | G01B 5/18 33/561.1 |
| 5,611,149 | A | * | 3/1997 | Fujiwara | G01B 5/0037 33/534 |
| 10,809,047 | B2 | * | 10/2020 | Rettig | G01B 5/0037 |
| 2003/0126753 | A1 | * | 7/2003 | Barefoot | B23K 9/00 33/501.45 |
| 2004/0045180 | A1 | * | 3/2004 | Barefoot | G01B 3/50 33/501.45 |
| 2008/0276475 | A1 | * | 11/2008 | Schafer | G01B 3/34 33/501.45 |
| 2009/0307919 | A1 | * | 12/2009 | Lee | G01B 5/06 33/679.1 |
| 2015/0082646 | A1 | * | 3/2015 | Palynchuk | G01B 5/0037 33/548 |

* cited by examiner

*Primary Examiner* — George B Bennett
(74) *Attorney, Agent, or Firm* — Ira M. Turner

(57) ABSTRACT

A depth gauge tool is provided. The depth gauge tool includes a first side coupled to a second side and at least one depth gauge disposed there between; the at least one depth gauge configured with at least one slot adapted for receiving a hot electrode of a tungsten inert gas (TIG) welding torch and an aiding adjustment of a depth of the electrode in relation to a periphery of a gas cup surrounding the electrode.

14 Claims, 5 Drawing Sheets

DEPTH GAUGE

BACKGROUND OF THE INVENTION

1. Field of the Invention

The invention disclosed herein relates to welding equipment, and in particular to an methods and apparatus for adjusting electrodes used in welding.

2. Description of the Related Art

Gas tungsten arc welding (GTAW), also known as tungsten inert gas (TIG) welding, is an arc welding process that uses a non-consumable tungsten electrode to produce the weld. The weld area and electrode is protected from oxidation or other atmospheric contamination by an inert shielding gas (for example, argon or helium), and a filler metal is normally used, though some welds, known as autogenous welds, do not require it. A constant-current welding power supply produces electrical energy, which is conducted across the arc through a column of highly ionized gas and metal vapors known as a plasma.

GTAW is most commonly used to weld sections of stainless steel and non-ferrous metals such as aluminum, magnesium, copper as well as alloys such as Inconel, Hastelloy and Stellite. The process grants the operator greater control over the weld than competing processes such as shielded metal arc welding and gas metal arc welding, allowing for stronger, higher quality welds. However, GTAW is comparatively more complex and difficult to master, and furthermore, it is significantly slower than most other welding techniques. A related process, plasma arc welding, uses a slightly different welding torch to create a more focused welding arc and as a result is often automated.

Manual gas tungsten arc welding is a relatively difficult welding method, due to the coordination required by the welder. Similar to torch welding, GTAW normally requires two hands, since most applications require that the welder manually feed a filler metal into the weld area with one hand while manipulating the welding torch in the other. Maintaining a short arc length, while preventing contact between the electrode and the workpiece, is also important.

To strike the welding arc, a high frequency generator (similar to a Tesla coil) provides an electric spark. This spark is a conductive path for the welding current through the shielding gas and allows the arc to be initiated while the electrode and the workpiece are separated, typically about 1.5-3 mm (0.06-0.12 in) apart.

Once the arc is struck, the welder moves the torch in a small circle to create a welding pool, the size of which depends on the size of the electrode and the amount of current. While maintaining a constant separation between the electrode and the workpiece, the operator then moves the torch back slightly and tilts it backward about 10-15 degrees from vertical. Filler metal is added manually to the front end of the weld pool as it is needed.

Welders often develop a technique of rapidly alternating between moving the torch forward (to advance the weld pool) and adding filler metal. The filler rod is withdrawn from the weld pool each time the electrode advances, but it is always kept inside the gas shield to prevent oxidation of its surface and contamination of the weld. Filler rods composed of metals with a low melting temperature, such as aluminum, require that the operator maintain some distance from the arc while staying inside the gas shield. If held too close to the arc, the filler rod can melt before it makes contact with the weld puddle. As the weld nears completion, the arc current is often gradually reduced to allow the weld crater to solidify and prevent the formation of crater cracks at the end of the weld.

The equipment required for the gas tungsten arc welding operation includes a welding torch utilizing a non-consumable tungsten electrode, a constant-current welding power supply, and a shielding gas source.

The internal metal parts of a torch are made of hard alloys of copper or brass so it can transmit current and heat effectively. The tungsten electrode must be held firmly in the center of the torch with an appropriately sized collet, and ports around the electrode provide a constant flow of shielding gas. Collets are sized according to the diameter of the tungsten electrode they hold. The body of the torch is made of heat-resistant, insulating plastics covering the metal components, providing insulation from heat and electricity to protect the welder.

The size of the welding torch nozzle depends on the amount of shielded area desired. The size of the gas nozzle depends upon the diameter of the electrode, the joint configuration, and the availability of access to the joint by the welder. The inside diameter of the nozzle is preferably at least three times the diameter of the electrode, but there are no hard rules. The welder judges the effectiveness of the shielding and increases the nozzle size to increase the area protected by the external gas shield as needed. The nozzle must be heat resistant and thus is normally made of alumina or a ceramic material, but fused quartz, a high purity glass, offers greater visibility. Devices can be inserted into the nozzle for special applications, such as gas lenses or valves to improve the control shielding gas flow to reduce turbulence and introduction of contaminated atmosphere into the shielded area.

The electrode used in GTAW is made of tungsten or a tungsten alloy, because tungsten has the highest melting temperature among pure metals, at 3,422° C. (6,192° F.). As a result, the electrode is not consumed during welding, though some erosion (called burn-off) can occur. Electrodes can have either a clean finish or a ground finish—clean finish electrodes have been chemically cleaned, while ground finish electrodes have been ground to a uniform size and have a polished surface, making them optimal for heat conduction. The diameter of the electrode can vary between 0.5 and 6.4 millimetres (0.02 and 0.25 in), and their length can range from 75 to 610 millimetres (3.0 to 24.0 in).

A number of tungsten alloys have been standardized by the International Organization for Standardization and the American Welding Society in ISO 6848 and AWS A5.12, respectively, for use in GTAW electrodes, and are summarized in the adjacent table.

Pure tungsten electrodes (classified as WP or EWP) are general purpose and low cost electrodes. They have poor heat resistance and electron emission. They find limited use in AC welding of e.g. magnesium and aluminum.

Cerium oxide (or ceria) as an alloying element improves arc stability and ease of starting while decreasing burn-off. Cerium addition is not as effective as thorium but works well, and cerium is not radioactive. An alloy of lanthanum oxide (or lanthana) has a similar effect as cerium, and is also not radioactive. Thorium oxide (or thoria) alloy electrodes offer excellent arc performance and starting, making them popular general purpose electrodes. However, it is somewhat radioactive, making inhalation of thorium vapors and dust a health risk, and disposal an environmental risk. Electrodes containing zirconium oxide (or zirconia) increase the current capacity while improving arc stability and starting while also increasing electrode life.

As with other welding processes such as gas metal arc welding, shielding gases are necessary in GTAW to protect the welding area from atmospheric gases such as nitrogen and oxygen, which can cause fusion defects, porosity, and weld metal embrittlement if they come in contact with the electrode, the arc, or the welding metal. The gas also transfers heat from the tungsten electrode to the metal, and it helps start and maintain a stable arc.

The selection of a shielding gas depends on several factors, including the type of material being welded, joint design, and desired final weld appearance. Argon is the most commonly used shielding gas for GTAW, since it helps prevent defects due to a varying arc length. When used with alternating current, argon shielding results in high weld quality and good appearance. Another common shielding gas, helium, is most often used to increase the weld penetration in a joint, to increase the welding speed, and to weld metals with high heat conductivity, such as copper and aluminum. A significant disadvantage is the difficulty of striking an arc with helium gas, and the decreased weld quality associated with a varying arc length.

Argon-helium mixtures are also frequently utilized in GTAW, since they can increase control of the heat input while maintaining the benefits of using argon. Normally, the mixtures are made with primarily helium (often about 75% or higher) and a balance of argon. These mixtures increase the speed and quality of the AC welding of aluminum, and also make it easier to strike an arc. Another shielding gas mixture, argon-hydrogen, is used in the mechanized welding of light gauge stainless steel, but because hydrogen can cause porosity, its uses are limited. [30] Similarly, nitrogen can sometimes be added to argon to help stabilize the austenite in austenitic stainless steels and increase penetration when welding copper. Due to porosity problems in ferritic steels and limited benefits, however, it is not a popular shielding gas additive.

As one may surmise, efficacy of the shielding gas is dependent upon, among other things, the dimensional relationship of the electrode with the surrounding collet. That is, an electrode extended substantially beyond the collet will cause welding to occur in an environment influenced by other gases, thus causing the poor welds and even porosity. Conversely, an electrode substantially within the collet will limit exposure of the electrode, thus causing the poor welds.

Typically, adjustment of the electrode in relation to the collet is performed manually. Quite often, adjustment is not exacting and is time consuming. This is particularly the case where standards for the adjustment are applicable. Examples of applicable standards are promulgated by various agencies and institutions (such as ANSI, ASME, etc). These may be adopted by various customers such as pipe welding, pharmaceutical companies, aerospace and the military.

For perspective, FIGS. 1 and 2 depict aspects of a welding process and an example of a welding torch for use in a gas tungsten arc welding operation. These illustrations are provided to lend perspective to the teachings herein and are not to be construed as limiting of the invention.

As shown in FIG. 1, a first workpiece 1 may be welded to a second workpiece 2 by a welding procedure. The welding procedure makes use of a gas tungsten arc welding torch 10 (or simply "torch" 10) and filler material 5 to create weld 3. Generally, the torch 10 has a body 20. Generally, the body 20 extends into a handle for the user (not shown) to permit manual manipulation. Extending through the body 20 is a gas supply 30 and an electric supply 40. Generally, the gas supply 30 is ported to a volume that is bounded by a gas cup 70. Centered within the gas cup 70 is collet 50. Secured within the collet 50 is electrode 60.

Generally, in operation, electricity from the electrode 60 will create a plasma puddle 4 when adequately close to first workpiece 1 and second workpiece 2. Generally, the gas cup 70 serves to retain gas from the gas supply 30 within a work area such that oxygen and other contaminants are not involved in the plasma puddle, thus resulting in a clean weld 3.

Geometry of the equipment used is of particular concern to be assured of desired weld quality. For example, too small of a gas cup 70 will permit some inflow of contaminants. Having an electrode that extends too far from the gas volume created in the work area will likewise permit inflow of contaminants. Similarly, a large electrode 60 may overwhelm a smaller gas supply.

As may be imagined, a number of standards for welding have been developed. These standards take the guesswork out of configuring equipment for welding operations. Among other things, consideration is given to materials being worked, the depth, d, that the electrode 60 extends beyond a collar of the gas cup 70, a diameter (or size), s, of the electrode 60, the gas cup 70 a diameter, w, as well as other factors such as configuration of the gas supply 30 and the electric supply 40.

Sources of standards include manufacturers, standards setting bodies (such as ANSI, ASME and others), regulations, customers, and contracts. Compliance with such standards is of paramount importance for some operations, such as where welding is performed in the course of ship building.

Thus, what are needed are methods and apparatus to provide for quick and consistent adjustment of electrodes in relation to surrounding gas cups.

SUMMARY OF THE INVENTION

In one embodiment, a depth gauge tool is provided. The depth gauge tool includes a first side coupled to a second side and at least one depth gauge disposed there between; the at least one depth gauge configured with at least one slot adapted for receiving a hot electrode of a tungsten inert gas (TIG) welding torch and an aiding adjustment of a depth of the electrode in relation to a periphery of a gas cup surrounding the electrode.

A width of the slot may be configured to substantially match the width of the electrode. The width of the slot may be one of 0.010, 0.020, 0.040, 1/16, 3/32, 1/8, 5/32, 3/16 and 1/4 of an inch. The first side may be joined to the second side by a plurality of couplers. At least one of the couplers may include a nut and a bolt. At least one of the couplers may include a pin with at least one hole adapted for receiving a cotter pin. At least one depth gauge may include a high temperature material suited for receiving a hot electrode. At least one of the couplers may include a spindle about which the at least one depth gauge is rotatable. At least one depth gauge may include a tab for selection of the depth gauge when disposed in the depth gauge tool. A slot of the at least one depth gauge may include an electrode retention system. The electrode retention system may include at least retention cup. At least one depth gauge may be fabricated from a thickness of sheet stock that substantially matches a diameter of an electrode. The first side may be joined to the second side as a unitary device.

In another embodiment, a depth gauge tool is provided and includes a plurality of depth gauges configured with at least one slot adapted for receiving a hot electrode of a tungsten inert gas (TIG) welding torch and an aiding adjustment of a depth of the electrode in relation to a periphery of a gas cup surrounding the electrode wherein the plurality of depth gauges are aggregated as a depth gauge tool by a length of material passed through a through-way in each of the depth gauges.

BRIEF DESCRIPTION OF THE DRAWINGS

The features and advantages of the invention are apparent from the following description taken in conjunction with the accompanying drawings in which.

DETAILED DESCRIPTION OF THE INVENTION

Disclosed herein are methods and apparatus for performing adjustment of electrodes in tungsten inert gas (TIG) welding systems. Generally, the techniques disclosed provide for quick and consistent adjustment of the electrode 60 in relation to the surrounding gas cup 70.

Figure 2:
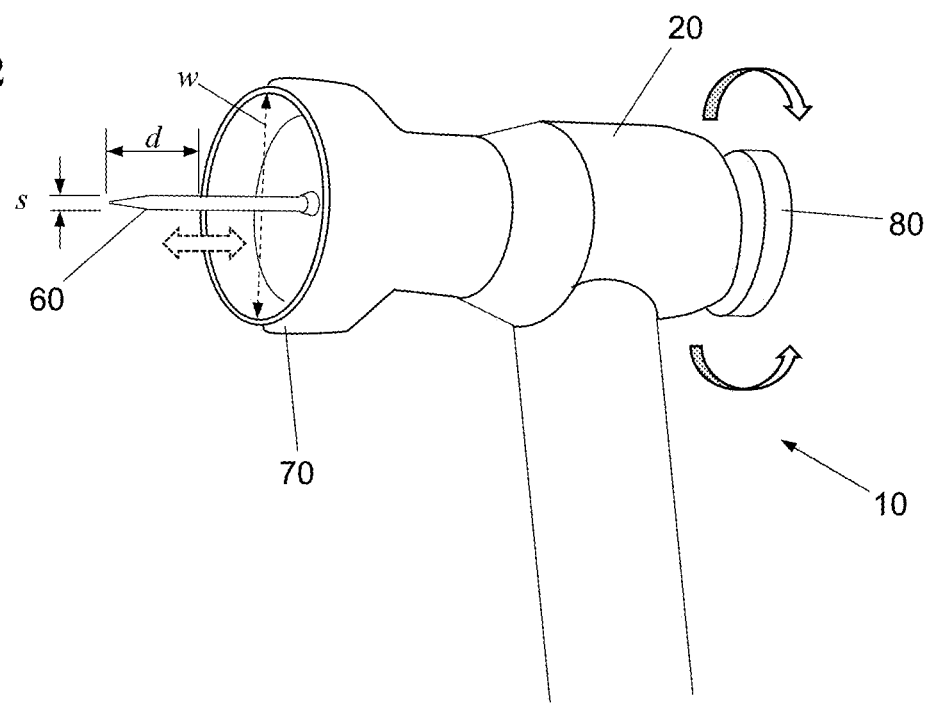
FIG. 2 is a perspective diagram depicting aspects a torch for TIG welding.

As shown in FIG. 2, the torch 10 includes a central electrode 60 extending from the gas cup 70. The extension of the electrode 60 is of a depth, d. Included in the welding tool or torch 10 is an adjustment control knob 80. The adjustment control knob 80 provides for adjusting an extension of the electrode 60 into or beyond the leading edge of the gas cup 60. The welding tool includes a handle 90 for the welder to enable use of the torch 10.

As one may surmise, different welding tasks call for electrodes of different dimensions. Electrodes 60 may extend anywhere between a minimal amount to substantially from the gas cup 70. Additionally, a particular electrode 60 may be of a minimal diameter up to a substantial diameter within the gas cup 70. The different electrodes 60 as may be used with different gas cups 70 result in a great variety of potential adjustments.

Disclosed herein are a variety of depth gauges for adjusting depth, d, of an electrode 60 in relation to the edge of an enclosing gas cup 70. Generally, the depth gauge includes a receiving area for receiving the electrode 40 selected for adjustment. The receiving area may be sized to receive electrodes of no greater than a certain diameter. Generally, depth or extension of the electrode is related to the diameter of the electrode. Of course, the relationship may exist for any one particular collet. For example, a first collet of a given diameter that is greater than the diameter of another collet will result in the first collet providing a more protective gas environment. Accordingly, an electrode of a standard diameter may extend further in the first collet then would be the case for the electrode if disposed in another collet. Examples of the depth gauge are provided in the following illustrations.

Figure 3:
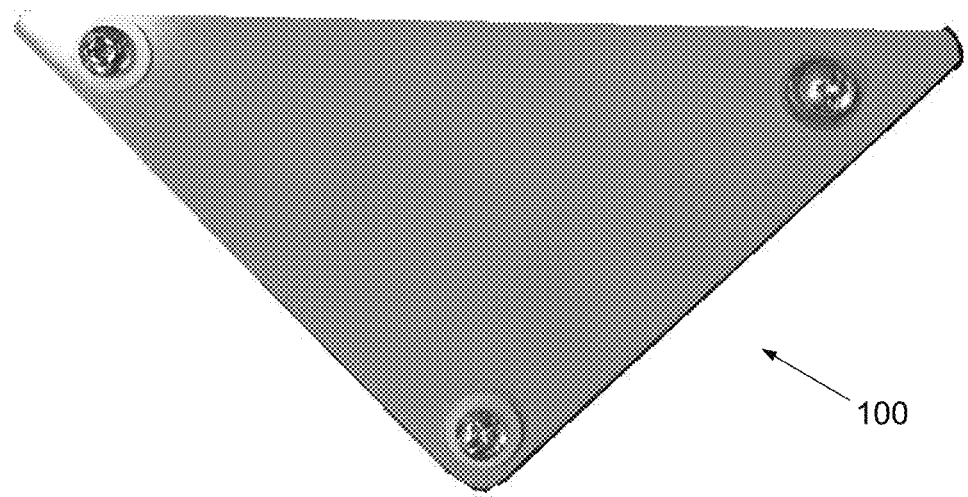
FIG. 3 top down view of a depth gauge tool.

Referring to FIG. 3, there is shown a top down view of the depth gauge tool 100. In this example, the depth gauge tool 100 has a triangular profile. The depth gauge tool 100 may be implemented with other geometries as deemed suitable. Generally, the depth gauge tool 100 is an index that contains an assembly of depth gauges which are described further herein.

Figure 4:
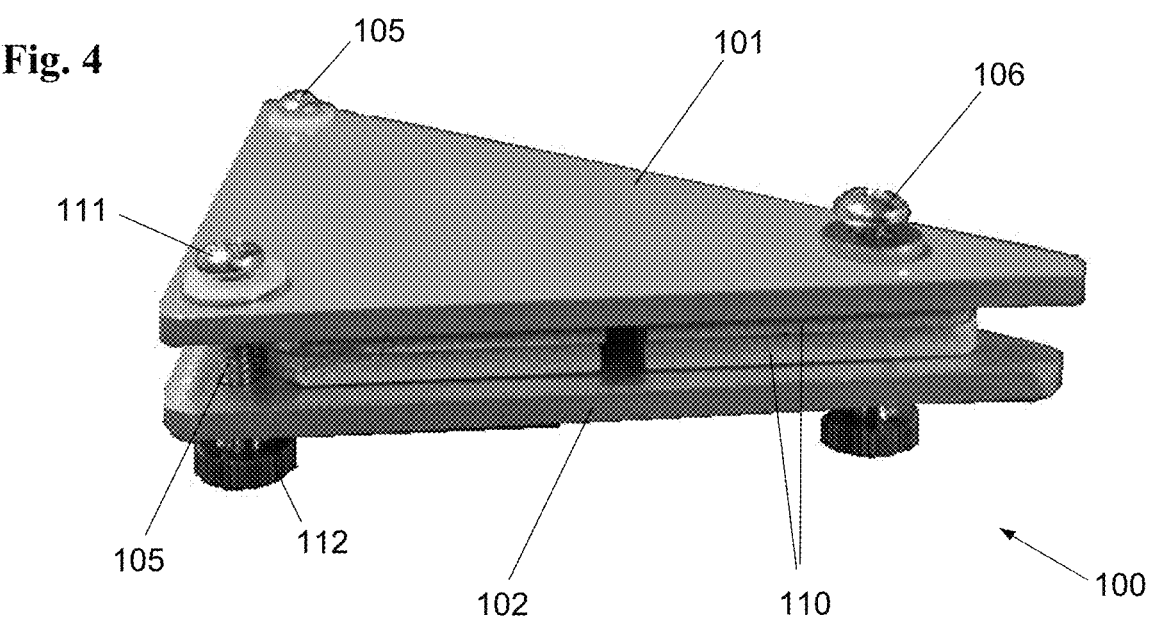
FIG. 4 is a perspective view of the depth gauge tool of FIG. 3.

In FIG. 4, a perspective side view of the depth gauge tool 100 is shown. In this illustration, it can be seen that the depth gauge tool 100 is a sandwich that includes a plurality of depth gauges 110 therein. The depth gauge tool 100 includes a first side 101 and a second side 102. The first side 101 and the second side 102 provide structural support for the depth gauge tool 100 and protect the plurality of depth gauges 110 therein. In this example, each corner of the triangular shape includes a coupling 105. The coupling 105 may be of any type suitable for coupling the first side 101 and the second side 102. For example, as shown in FIG. 4, the coupling 105 may include a bolt 111 and removable nut 112. By incorporation of the bolt 111 and removable nut 112, the depth gauge tool 100 may be easily disassembled, thus permitting access to the depth gauges 110 therein. Accordingly, a user may add or replace any one or more of the depth gauges 110 with relative ease. The coupling 105 may include other elements, such as a conventional bushing (not shown). In another example, the couplers 105 include pins with at least one hole suited for insertion of a cotter pin or similar retention device.

In this example, one of the couplings 105 serves as a spindle 106. The spindle 106 retains the depth gauges 110 within the depth gauge tool 100 and permits rotation thereof from between the first sider 101 and the second side 102.

Figure 5:
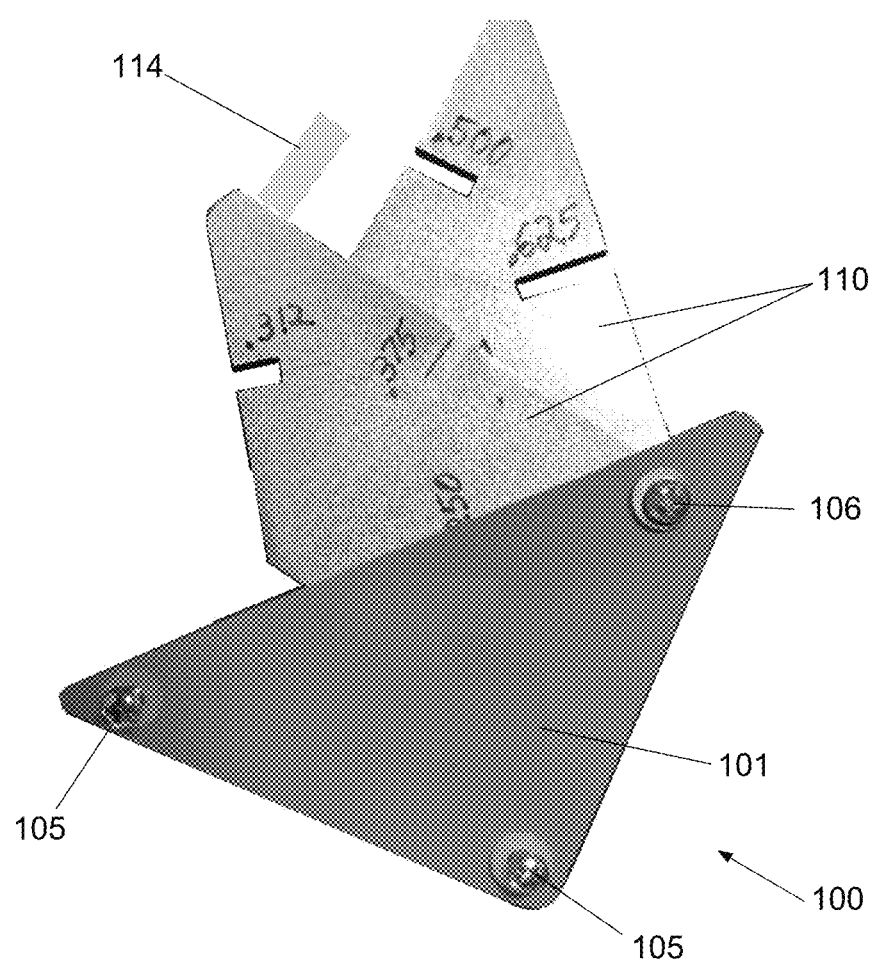
FIG. 5 is a top down view of the depth gauge tool of FIGS. 3 and 4 with two depth gauges partially shown.

In some embodiments, the first side 101 and the second side 102 are integrated. For example, a sidewall is included between the first side 101 and the second side 102 thus forming a unitary body for the depth gauge tool 100. In some embodiments, each of the depth gauges 110 may include an optional tab 114 (see FIG. 5). The optional tab 114 may be shaped or otherwise configured ergonomically. The tab 114 may include coding such that a user may readily distinguish one depth gauge 110 from another.

Figure 6:
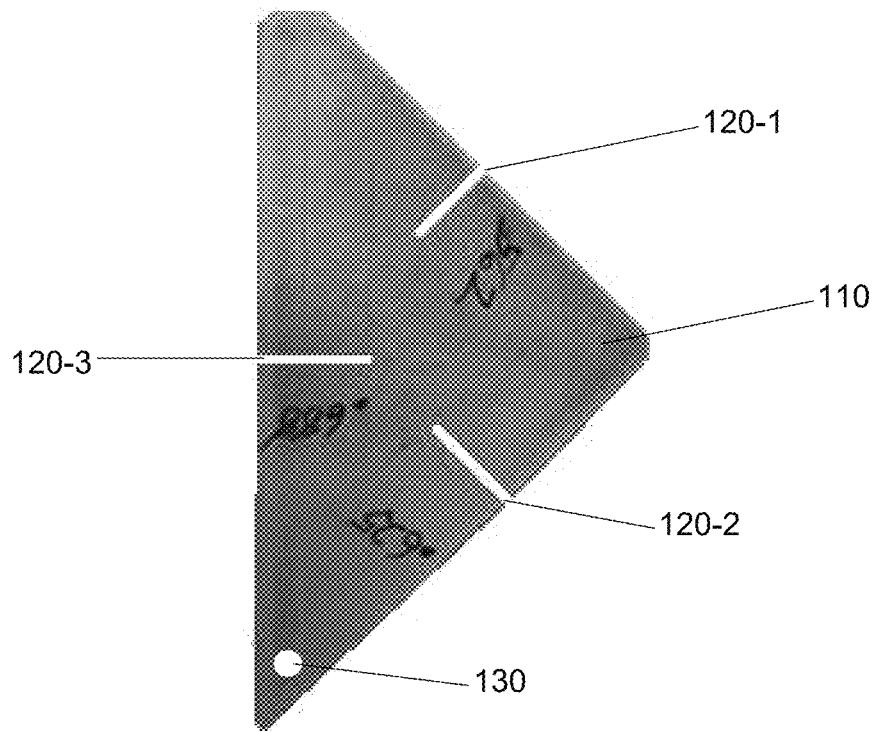
FIGS. 6 and 7 are each a top down view of the depth gauges shown in FIG. 5, wherein the depth gauges are removed from the depth gauge tool of FIGS. 3, 4 and 5.
Figure 7:
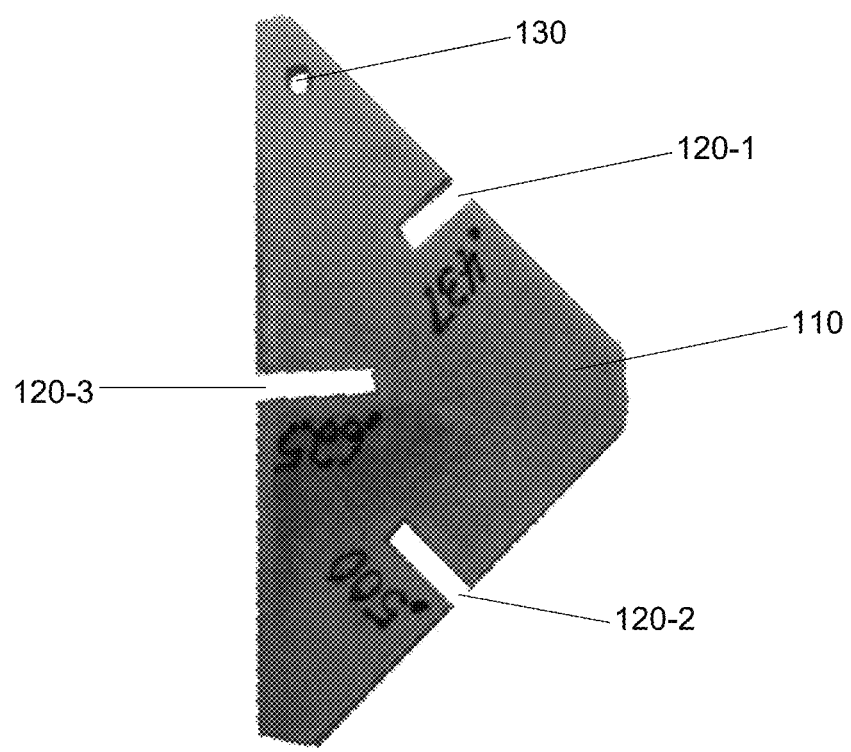

In FIG. 6, one of the depth gauges 110 is shown (another in FIG. 7). In this example, the depth gauge 110 is separate from the depth gauge tool 100. In this illustration, the depth gauge 110 includes three slots 120. Each slot 120 is labeled. The label signifies a depth, d. In use, the user will insert the electrode 60 into the slot 120 for the desired depth and adjust the control knob 80 until a tip of the electrode 60 reaches the end of the slot while the gas cup 70 remains firmly in contact with the outer edge of the depth gauge 110. It may be noted that the depth gauge 110 may include a through way 130 for mounting upon the spindle 106.

Figure 8:
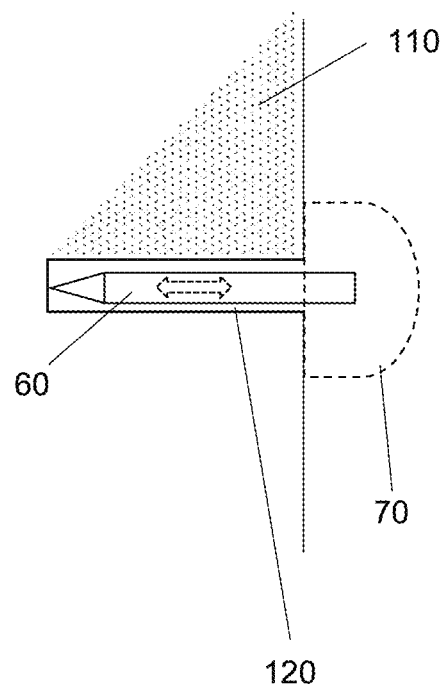
FIG. 8 depicts use of a depth gauge selected from the depth gauge tool.

As shown in FIG. 8, extension of the electrode 60 may be adjusted until it is in agreement with a depth of the slot 120.

Figure 9A:
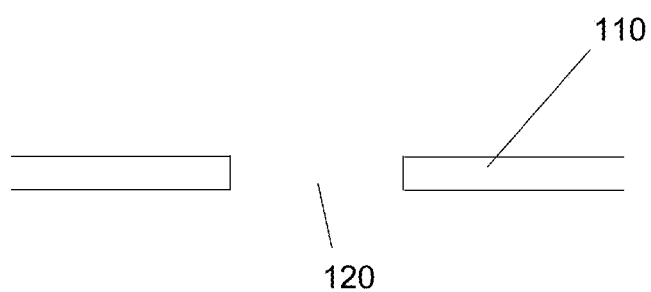
FIGS. 9A and 9B, collectively referred to herein as FIG. 9, are cross sectional views of embodiments showing portions of the templates; and, FIG. 10 depicts aspects of another embodiment of the depth gauges of FIGS. 5 through 7.
Figure 9B:
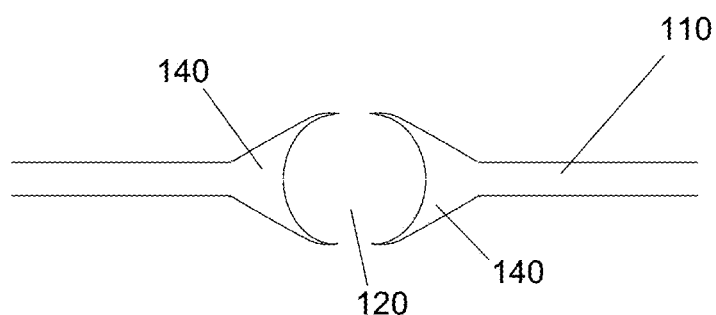

In FIG. 9, a side view of examples for profiles of the slots 120 are shown. In a first embodiment, shown in FIG. 9A, a standard implementation is shown. Generally, in the standard implementation, the depth gauge 110 is fabricated from flat stock. In a second embodiment, shown in FIG. 9B, an electrode retention system is formed by, for example, opposing retention cups 140. A portion of the width of the slot 120 is visible between the opposing retention cups 140. Generally, the opposing retention cups 140 provide for enhanced retention of the electrode 60 during the adjustment process. In some embodiments, only one retention cup 140 is used.

Figure 10:
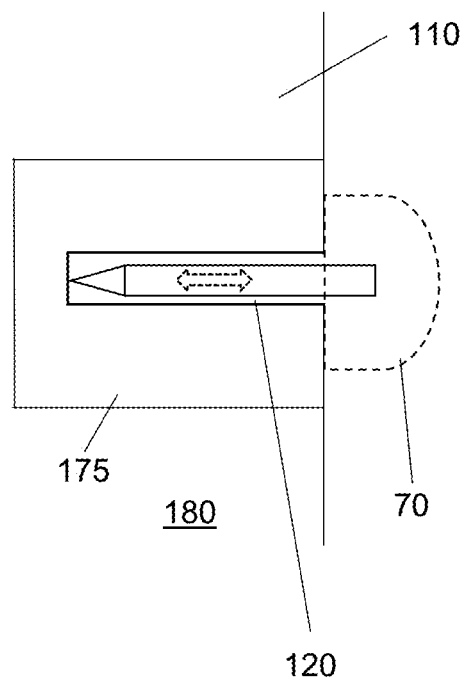

In one embodiment, shown in FIG. 10, the depth gauge 110 includes a low temperature material, such as plastic, as a body 180 of the depth gauge 110. Set into the body 180 is a high temperature insert 175.

Having introduced embodiments of the depth gauge tool, some further aspects are set forth.

Generally, each of the depth gauges may be fabricated from metal or other materials that will not degrade with high temperature exposure. Each of the depth gauges may be fabricated from material that is matched to the thickness of a given electrode for which it is intended. In some embodiments, the couplings are permanent and not removable. For example, in some embodiments, the couplings are set with rivets. The depth gauge tool may include a convenience fastener, such as a clip for attaching to the belt of a user.

Common values for electrode diameter include (in inches): 0.010, 0.020, 0.040, 1/16, 3/32, 1/8, 5/32, 3/16 and 1/4.

In the examples provided, each depth gauge is fabricated from a sheet of stock. The stock may be metal and may include aluminum, steel, copper, iron, and various alloys thereof. The stock may be fiberglass and/or carbon fiber with a high temperature resin binder, a high temperature silicone material (such as used in gaskets) and/or various other similar materials.

The first side 101 and the second side 102 may be fabricated from any suitable material. For example, in addition to the foregoing sheet stock suited for each of the depth gauges, the sides may be fabricated from plastic, wood, and/or other low temperature materials.

Generally, disposed along a given side of each of the depth gauges is at least one standard. Generally, each standard includes labeling for a particular electrode. The standard exhibits a particular width and depth. In practice, the user will insert the electrode into the standard and adjust the adjustment control until the collet aligns with the outer edge of the depth gauge. The result is efficient and reproducible adjustment of electrode depth.

Generally, each slot is configured for receiving a hot electrode. That is, each depth gauge may be a composite assembly that contains, for example, a low temperature (e.g., plastic body) with a high temperature liner.

In some embodiments, a plurality of depth gauges 110 are aggregated without the use of the case created by the combined first side 101 and second side 102. For example, the depth gauges 110 may be disposed on a chain, cable or string.

Figure 1:
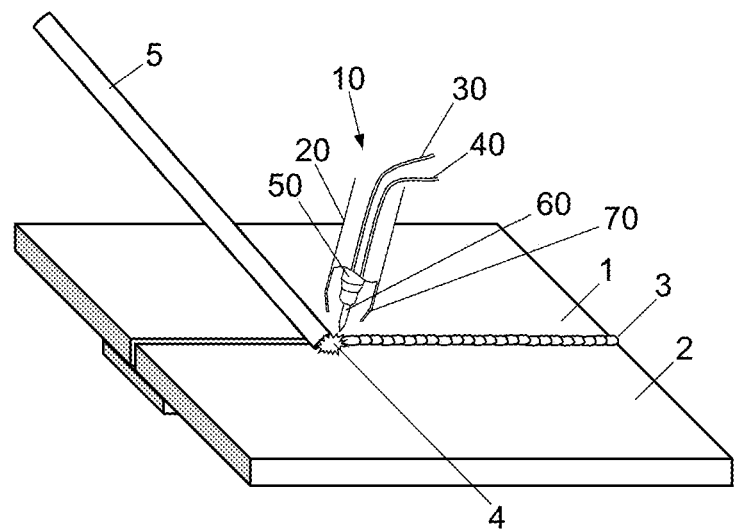
FIG. 1 is an schematic diagram depicting a setup for performing tungsten inert gas (TIG) welding.

Reference numbers used herein include:
FIGS. 1, 2
1 first workpiece
2 second workpiece
3 weld
4 plasma puddle
5 filler material
10 torch
20 body
30 gas supply
40 electric supply
50 collet
60 electrode
70 gas cup
80 adjustment control knob
FIGS. 3, 4
100 depth gauge tool
101 first side
102 second side
105 coupling
106 spindle
110 depth gauge
111 bolt
112 nut
114 tab
120 slot
130 through-way
140 retention cup
FIG. 10
175 insert
180 body A variety of modifications of the teachings herein may be realized. Generally, modifications may be designed according to the needs of a user, designer, manufacturer or other similarly interested party. The modifications may be intended to meet a particular standard of performance considered important by that party. Similarly, acceptability of performance is to be assessed by the appropriate user, designer, manufacturer or other similarly interested party.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Note that it is not intended that any functional language used in claims appended herein be construed as invoking 35 U. S.C. § 112(f) interpretations as "means-plus-function" language unless specifically expressed as such by use of the words "means for" or "steps for" within the respective claim.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A depth gauge tool comprising:
a first side coupled to a second side and at least one depth gauge disposed there between; the at least one depth gauge configured with at least one slot adapted for receiving a hot electrode of a tungsten inert gas (TIG) welding torch and an aiding adjustment of a depth of the electrode in relation to a periphery of a gas cup surrounding the electrode.

2. The depth gauge tool of claim 1, wherein a width of the slot is configured to substantially match the width of the electrode.

3. The depth gauge tool of claim 2, wherein the width is one of 0.010, 0.020, 0.040, 1/16, 3/32, 1/8, 5/32, 3/16 and 1/4 of an inch.

4. The depth gauge tool of claim 1, wherein the first side is joined to the second side by a plurality of couplers.

5. The depth gauge tool of claim 1, wherein at least one of the couplers includes a nut and a bolt.

6. The depth gauge tool of claim 1, wherein at least one of the couplers includes a pin with at least one hole adapted for receiving a cotter pin.

7. The depth gauge tool of claim 1, wherein the at least one depth gauge comprises a high temperature material suited for receiving a hot electrode.

8. The depth gauge tool of claim 1, wherein at least one of the couplers includes a spindle about which the at least one depth gauge is rotatable.

9. The depth gauge tool of claim 1, wherein the at least one depth gauge includes a tab for selection of the depth gauge when disposed in the depth gauge tool.

10. The depth gauge tool of claim 1, wherein a slot of the at least one depth gauge includes an electrode retention system.

11. The depth gauge tool of claim 1, wherein the electrode retention system comprises at least retention cup.

12. The depth gauge tool of claim 1, wherein the at least one depth gauge is fabricated from a thickness of sheet stock that substantially matches a diameter of an electrode.

13. The depth gauge tool of claim 1, wherein the first side is joined to the second side as a unitary device.

14. A depth gauge tool comprising:
a plurality of depth gauges configured with at least one slot adapted for receiving a hot electrode of a tungsten inert gas (TIG) welding torch and an aiding adjustment of a depth of the electrode in relation to a periphery of a gas cup surrounding the electrode;
wherein the plurality of depth gauges are aggregated as a depth gauge tool by a length of material passed through a through-way in each of the depth gauges.

* * * * *